(12) United States Patent
Lu et al.

(10) Patent No.: US 9,109,913 B2
(45) Date of Patent: Aug. 18, 2015

(54) ROADWAY-INDUCED RIDE QUALITY RECONNAISSANCE AND ROUTE PLANNING

(71) Applicant: FORD GLOBAL TECHNOLOGIES, LLC, Dearborn, MI (US)

(72) Inventors: Jianbo Lu, Northville, MI (US); Dimitar P. Feliv, Novi, MI (US); Davor Hrovat, Ann Arbor, MI (US); Finn Tseng, Ann Arbor, MI (US); Timothy M. Feldkamp, Ann Arbor, MI (US); John O. Michelini, Sterling Heights, MI (US); Imad Hassan Makki, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/041,596

(22) Filed: Sep. 30, 2013

(65) Prior Publication Data

US 2015/0094948 A1    Apr. 2, 2015

(51) Int. Cl.
*G01C 21/34* (2006.01)
*G08G 1/01* (2006.01)
*G08G 1/0968* (2006.01)

(52) U.S. Cl.
CPC .......... *G01C 21/3461* (2013.01); *G08G 1/0112* (2013.01); *G08G 1/0129* (2013.01); *G08G 1/09685* (2013.01); *G08G 1/096816* (2013.01); *G08G 1/096838* (2013.01)

(58) Field of Classification Search
CPC . G08G 1/0104; G08G 1/0112; G08G 1/0133; G01R 27/28; G01C 21/26
USPC ........................................................ 701/410
See application file for complete search history.

(56) References Cited

U.S. PATENT DOCUMENTS 6,577,943 B2    6/2003  Nakao et al.
6,584,401 B2 *  6/2003  Kirshenbaum et al. ....... 701/521
(Continued)

FOREIGN PATENT DOCUMENTS

CN    102486875       6/2012
CN    102486875 A  *  6/2012

OTHER PUBLICATIONS

D. Filev, et al., "Future Mobility: Integrated Vehicle Control with Cloud Computing," ASME Dynamic Systen & Control Magazine, No. 1, vol. 1, pp. 18-24, 2013 (inaugural issue).

*Primary Examiner* — John R Olszewski
*Assistant Examiner* — Jean-Paul Cass
(74) *Attorney, Agent, or Firm* — Gregory P. Brown; MacMillan, Sobanski & Todd, LLC

(57) ABSTRACT

Route planning for road vehicles is performed taking into account a ride quality that results from the roadway conditions along road segments on a route. A plurality of vehicles equipped with controlled suspensions calculate ride quality indices as the vehicles move over a plurality of road segments. The plurality of vehicles transmit the ride quality indices tagged with respective geographic coordinates to an aggregating server. The aggregating server determines a composite ride quality index for each road segment. A subscriber generates a route planning request identifying an origin and a destination. At least one potential route is identified between the origin and the destination comprised of selected road segments. A route ride quality index is determined in response to the selected road segments, and the potential route and the route ride quality index are presented to the subscriber for selection.

19 Claims, 4 Drawing Sheets

(56) References Cited

U.S. PATENT DOCUMENTS

| | | | |
|---|---|---|---|
| 6,611,150 B1* | 8/2003 | Stevens | 324/613 |
| 7,164,117 B2* | 1/2007 | Breed et al. | 250/221 |
| 7,397,370 B2* | 7/2008 | Bratkovski | 340/539.26 |
| 7,421,334 B2 | 9/2008 | Dahlgren et al. | |
| 7,840,342 B1 | 11/2010 | Breed | |
| 7,878,510 B2 | 2/2011 | Knox et al. | |
| 8,111,157 B2* | 2/2012 | Diener et al. | 340/545.6 |
| 8,121,784 B2* | 2/2012 | Templeton et al. | 701/516 |
| 8,150,465 B2 | 4/2012 | Zhang et al. | |
| 8,260,496 B2 | 9/2012 | Gagliano | |
| 8,423,255 B2 | 4/2013 | Padmanabhan et al. | |
| 8,451,140 B2 | 5/2013 | Piccinini et al. | |
| 8,566,010 B2* | 10/2013 | Sarma et al. | 701/118 |
| 2005/0046584 A1* | 3/2005 | Breed | 340/825.72 |
| 2006/0208169 A1* | 9/2006 | Breed et al. | 250/221 |
| 2007/0189181 A1 | 8/2007 | Kirk et al. | |
| 2009/0069972 A1* | 3/2009 | Templeton et al. | 701/29 |
| 2009/0138188 A1* | 5/2009 | Kores et al. | 701/117 |
| 2011/0112764 A1 | 5/2011 | Trum | |
| 2011/0152729 A1* | 6/2011 | Oohashi et al. | 601/2 |
| 2011/0320111 A1* | 12/2011 | Sarma et al. | 701/118 |
| 2012/0065871 A1* | 3/2012 | Deshpande et al. | 701/118 |
| 2013/0155061 A1* | 6/2013 | Jahanshahi et al. | 345/419 |
| 2014/0114509 A1* | 4/2014 | Venables et al. | 701/21 |

\* cited by examiner

ROADWAY-INDUCED RIDE QUALITY RECONNAISSANCE AND ROUTE PLANNING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to route planning and navigation for road vehicles, and, more specifically, to determining preferred routes in response to roadway conditions that affect the ride quality felt by occupants in a vehicle following a route.

Roadway vehicles such as cars and trucks utilize dampers between the wheels and vehicle body to improve the ride comfort for the vehicle occupants. In addition to static damping systems such as traditional shock absorbers, adaptive (a.k.a. continuously-controlled) dampers have been introduced in which the damping automatically adjusts to match the driving conditions, resulting in a smooth, comfortable ride experience.

The ride behavior of a vehicle (i.e., vibration within the suspension/body system) is composed of two main components known as primary ride and secondary ride. Primary ride refers to body motion caused by a large bump or discontinuity. The suspension motion corresponding to primary ride is characterized by high amplitude and low frequency, such as a frequency range from about one to two Hz. Secondary ride refers to suspension motion having a lower amplitude and a higher frequency, such as around ten Hz., caused by smaller scale but more numerous imperfections in a road surface.

Especially for vehicles without adaptive damping, the ride comfort along some roads may be undesirable or unacceptable to some drivers. Thus, if a particular roadway was known in advance to have rough surfaces creating significant primary and/or secondary ride issues, then some drivers might choose to avoid them whenever reasonably possible.

Navigation systems for performing route planning to drive a vehicle to a desired destination are known which optimize potential routes according to various factors, such as travel time, travel distance, and maximum or minimum use of freeways. Ride quality, however, has not been available as a parameter for evaluating the desirability of different potential routes. Moreover, the supporting data needed to evaluate the ride comfort associated with different segments of roadway does not exist and would be expensive and time consuming to create.

SUMMARY OF THE INVENTION

In one aspect of the invention, a route planning system for road vehicles comprises a ride quality database representing a plurality of road segments according to geographic coordinates. An agent is coupled to the ride quality database and is adapted to be coupled to a data network. The agent is configured to receive ride quality data via the data network from a plurality of vehicles traversing the road segments and to determine a composite ride quality index for each road segment according to the received ride quality data. The ride quality data and the composite ride quality indices are stored in the ride quality database in association with the respective road segments. The agent is configured to receive routing requests and to respond to the routing requests by retrieving composite ride quality indices corresponding to road segments identified by the routing requests.

In another aspect of the invention, a method of route planning for road vehicles is provided. A plurality of vehicles equipped with controlled suspensions calculate ride quality indices as the vehicles move over a plurality of road segments. The plurality of vehicles transmit the ride quality indices tagged with respective geographic coordinates to an aggregating server. The aggregating server determines a composite ride quality index for each road segment. A subscriber generates a route planning request identifying an origin and a destination. At least one potential route is identified between the origin and the destination comprised of selected road segments. A route ride quality index is determined in response to the selected road segments. The potential route and the route ride quality index are presented to the subscriber for selection.

DETAILED DESCRIPTION OF PREFERRED EMBODIMENTS

In the present invention, a cloud-based server receives, processes (e.g., averages), classifies (e.g., on a scale between smooth and rough), and stores vehicle-generated data from multiple vehicles through "crowdsourcing" and makes the classified data available to other vehicles for purposes of route planning. Thus, properly equipped vehicles are used as data probes to evaluate ride quality associated with road segments. More specifically, a crowdsourcing agent receives data from individual vehicles along various roads and generates ratings based on aggregated data from many vehicles that can be used to rank the average ride quality that can be expected when traversing the same roads. The resulting ratings are used by the drivers of other individual vehicles to evaluate and select driving routes where they can obtain a desired ride comfort.

Disturbances (i.e., vibrations) induced in the vehicle body and suspension by road surface imperfections have constituent frequencies of two main types. Primary ride relates to road undulations causing body motion with frequency range from one to two Hz. Secondary ride relates to road roughness causing wheel vibration with a frequency around 10 Hz. Traditional suspension systems make a compromise between reducing the magnitude primary ride disturbances (i.e., ride control) and reducing the magnitude of secondary ride disturbances (i.e., ride comfort). If a particular driver is sensitive to driving on fine-scale road roughness, he might wish to avoid routes through rough terrain (i.e., to avoid poor secondary ride performance). If the driver is instead more sensitive to large bumps or potholes, he might prefer to avoid driving on roads with poor primary ride performance. While a vehicle with a continuously-controlled suspension (e.g., continuously-controlled dampers) would reduce the driver's perception of poor primary ride and secondary ride, it cannot totally eliminate the feel. Thus, some drivers might still prefer to avoid road segments with significant primary or secondary ride even though their vehicle is equipped with adaptive dampers. On the other hand, not all the vehicles are equipped with controlled suspensions. Information about the ride quality for various road segments can be particularly useful to those drivers whose vehicles do not have controlled suspensions.

Figure 1:
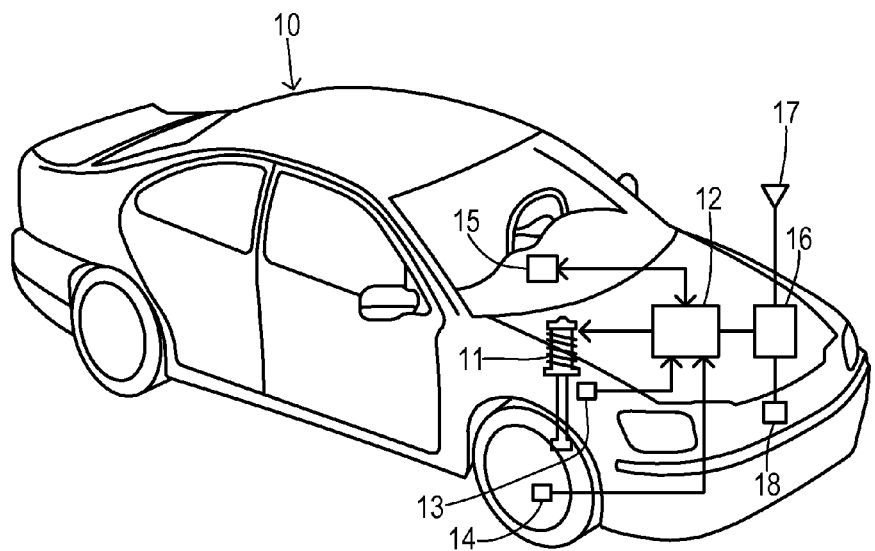
FIG. 1 is a diagram showing a vehicle having controlled dampers and a communication system for providing roadway-induced ride quality reconnaissance of the present invention.

Referring now to FIG. 1, a vehicle 10 which is suitable to be used as a data probe for obtaining ride quality data includes a controlled damper 11 coupled to a suspension controller 12. A suspension sensor 13 and a wheel sensor 14 are likewise coupled to suspension controller 12 as known in the art. A human machine interface (HMI) 15 coupled to controller 12 allows a driver to manually adjust the suspension and to monitor performance. Any known type of suspension actuators and sensors may be employed for the present invention, wherein controller 12 is adapted to communicate with a modem or other wireless communication module 16 for transmitting ride quality data to a remote server via an antenna 17. Suspension controller 12 continuously characterizes ride quality as vehicle 10 moves over a plurality of road segments based on signals from sensors 13 and 14 and on other computed variables as known in the art. In order to tag the ride quality data with geographic coordinates so that the ride quality data can be associated with particular pre-defined road segments, a GPS receiver 18 is preferably coupled to modem 16 and/or suspension controller 12.

Figure 2:
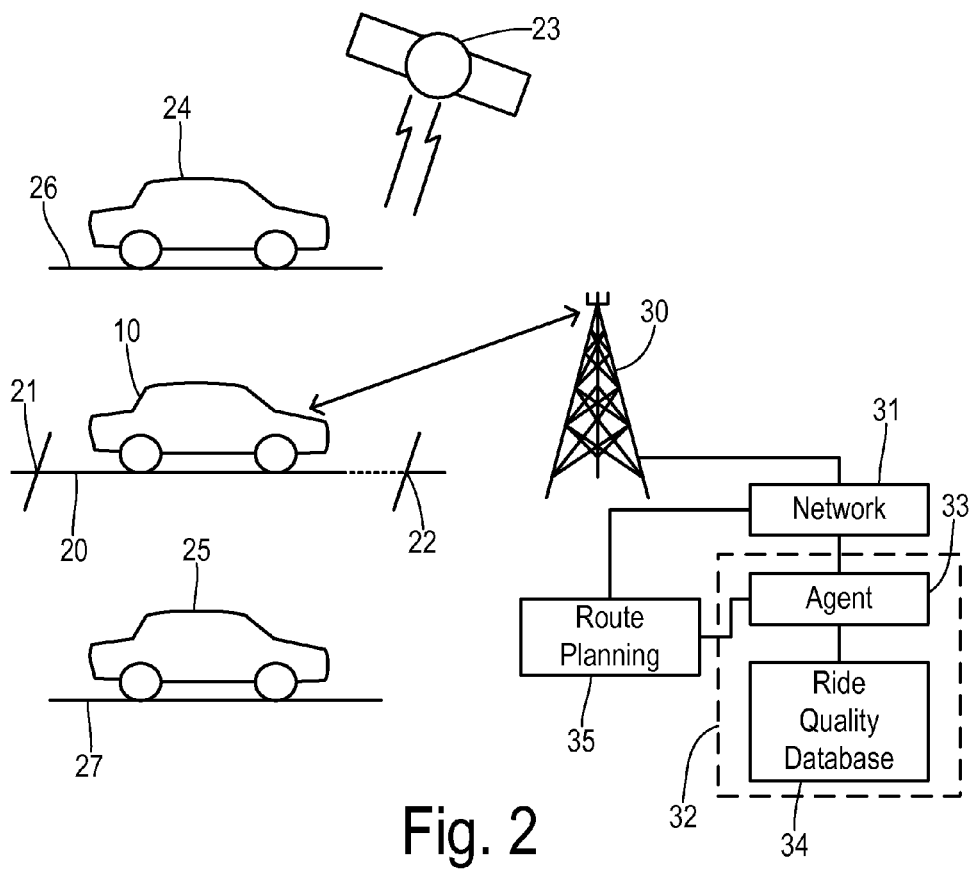
FIG. 2 is a diagram showing the elements of a route planning system of the invention.

An overall system of the present invention is shown in FIG. 2 which depicts vehicle 10 traversing a road segment 20. As represented in a typical subscription navigation database, road segment 20 may have end points at 21 and 22, for example. Vehicle 10 monitors signals from GPS satellites 23 to determine the geographic position of vehicle 10 and ascertain the identity of road segment 20. Similarly equipped vehicles 24 and 25 traversing different road segments 26 and 27 may likewise gather ride quality data which may be tagged with respective geographic coordinates also obtained by monitoring GPS satellites 23 and then remotely uploaded to a crowdsourced data repository.

For providing communication between data-probing vehicles 10, 24, and 25, a wireless cellular network including a cell site 30 may be provided. A data network 31 provides a communication path to an aggregating server 32 which includes a supervisory agent 33 and a ride quality database 34. A route planning function 35 utilizes the ride quality data from server 33 in order to identify the ride quality or comfort level associated with various potential routes. Route planning function 35 may be contained as a part of server 32, located on-board an individual vehicle, or performed by other servers or resources as part of a navigation service provided to subscribing drivers, for example.

Figure 3:
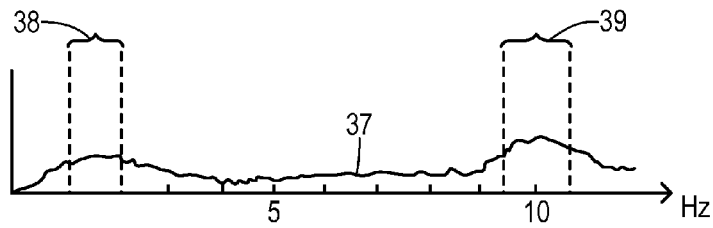
FIG. 3 is a plot showing a spectra of suspension displacement including primary ride and secondary ride.

FIG. 3 shows a plot representing a spectrum of suspension displacement for a vehicle traversing a road segment having a particular ride quality. A trace 37 represents the magnitude of suspension displacement energy corresponding to respective frequencies of the frequency spectrum. Primary ride is characterized by energy spanning a range 38 between 1 and 2 Hz. Secondary ride is characterized by frequencies in a range 39 around 10 Hz. As used in the present invention, a ride quality index may be formed separately for each of the primary ride and secondary ride, or a single blended value or index based on both primary and secondary ride may be employed. Moreover, the values or combinations of values of the primary and secondary ride may be classified according to a driver-perceived comfort scale, e.g., from smooth to rough, or other characterizations such as slightly bumpy, moderately bumpy, moderate vibrations, etc.

Figure 4:
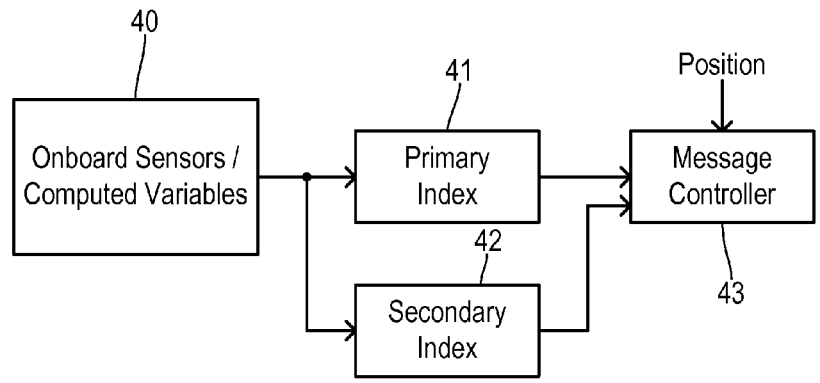
FIG. 4 is a block diagram of a probe vehicle of the invention.

FIG. 4 shows one preferred embodiment of an individual vehicle for performing as a data probe for determining both primary and secondary ride qualities. Thus, a plurality of on-board sensors and/or on-board computed values obtained in a block 40 provide the necessary parameters for calculating a primary ride quality index in a block 41 and a secondary ride quality index in a block 42. Such calculations are well known in the art. The resulting indices are provided to a message controller 43 which also receives a current geographic position from a GPS receiver or a dead-reckoning system (not shown). Message controller 43 sends tagged ride quality data via a data network to an aggregating server as described below.

Figure 5:
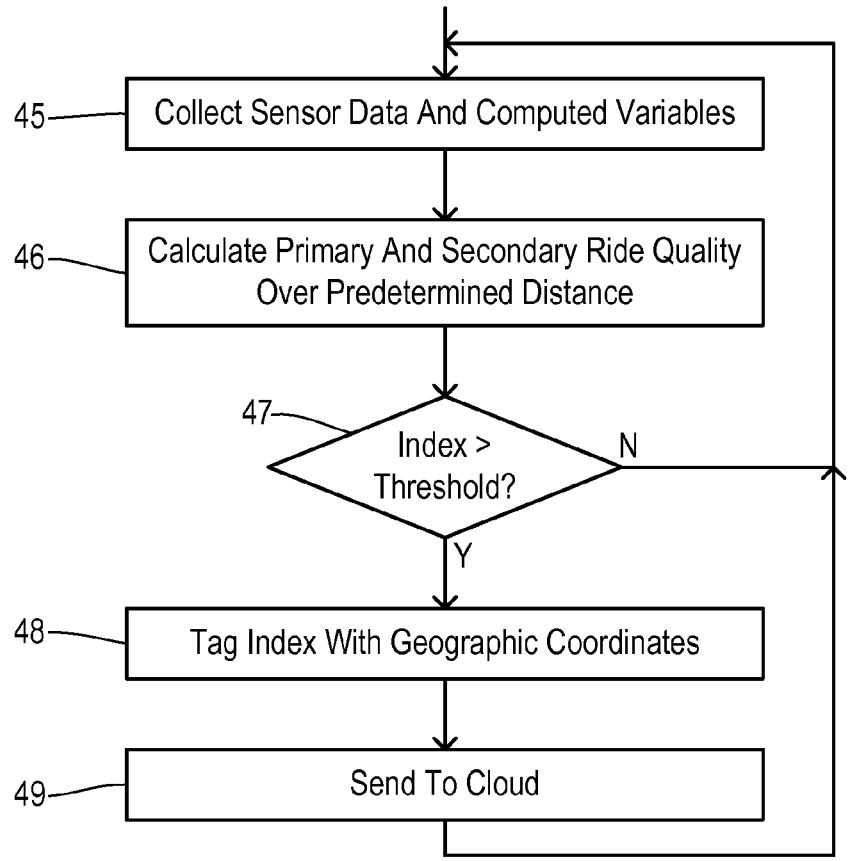
FIG. 5 is a flowchart of one preferred method performed by a probe vehicle of the invention.
Figure 7:
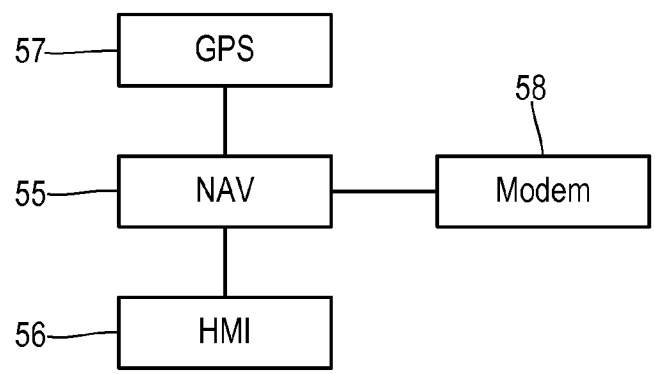
FIG. 7 is a block diagram of a subscriber vehicle for accessing the route planning of the present invention.

The vehicle system preferably operates according to a preferred method shown in FIG. 5. In step 45, sensor data is collected from motion sensors within the suspension and wheels, and various variables are computed in a suspension controller for controlling variable damping parameters. Using the computed variables and sensor data, primary and secondary ride quality indices may be continuously calculated covering a predetermined distance in step 46. In order to minimize the volume of network traffic associated with the collection of ride quality data from a large number of vehicles, a check is make in step 47 to determine whether a calculated index is greater than a predetermined threshold (i.e., has a value indicating a sufficiently noticeable degradation in ride quality). If a calculated index is not greater than the threshold then a return is made to step 45 for continuing to monitor ride quality. Otherwise, the index values above the threshold are tagged with geographic coordinates in step 48 and then sent to the cloud-based server in step 49.

Figure 6:
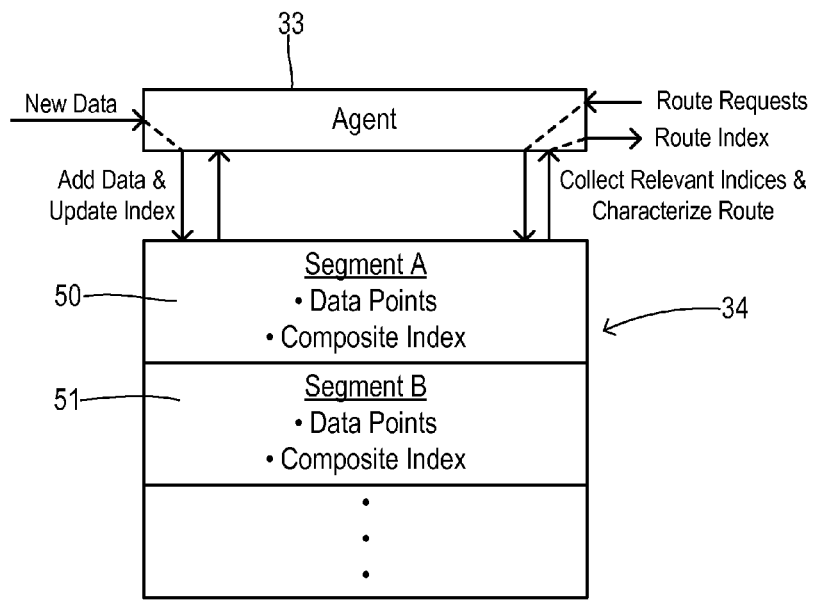
FIG. 6 shows a network server according to one embodiment of the invention.

FIG. 6 shows the cloud-based aggregating server which collects the crowdsourced road quality data. Specifically, agent 33 receives and processes the new data. Based on the tagged geographic coordinates, it identifies a corresponding road segment. For each road segment within a region being covered by the route planning system, respective data records (such as record 50 and record 51) are maintained for storing the collected data points from all the respective vehicles together with a composite index formed by combining (e.g., averaging) these separate index value data points. In the event that no data points have been received for a particular road segment, a default value for the corresponding ride quality index may be used (e.g., a default value indicating a smooth road). Each composite index may correspond with a primary ride quality, a secondary ride quality, or a combination of the two. Either numerical or qualitative index values can be maintained.

Since ride quality on any particular surface depends in part on the speed of the vehicle, the use of crowdsourcing collection and aggregation of actual data from vehicles driving on the road segments in real time results in a highly useful and accurate database.

Once the road quality database is sufficiently built up, the data is used to support route planning by other vehicles. FIG.

7 shows functional elements in a vehicle of a subscriber to a route planning service that uses the ride quality data stored on the aggregating server. A navigation system 55 is coupled to an HMI 56 through which a subscribing user can input a desired destination, identify a desired ride quality or comfort to be maintained across a route, and/or select between several potential routes that may be displayed with their corresponding ride quality indices. Navigation system 55 is coupled to a GPS receiver 57 for monitoring the geographic coordinates of the vehicle. A modem 58 is coupled to navigation system 55 for interacting with the aggregating server in order to generate routing requests and to receive ride quality-based routing information.

Returning to FIG. 6, agent 33 receives route requests from subscribers. Depending on which particular units perform the determination of potential routes (i.e., whether performed on-board the vehicle or off-board at the aggregating server or other sources in the network), the routing requests may identify specific road segments for which ride quality data is being requested or may identify a target ride quality and a destination so that agent 33 can identify the appropriate road segments for route planning. In a preferred embodiment, agent 33 collects relevant indices for road segments included in a potential route and then characterizes an overall route index for the complete route by combining the indices of the individual road segments. For example, an average value can be calculated. Alternatively, a worst-case comfort value along a potential route may be used as an overall route index.

Figure 8:
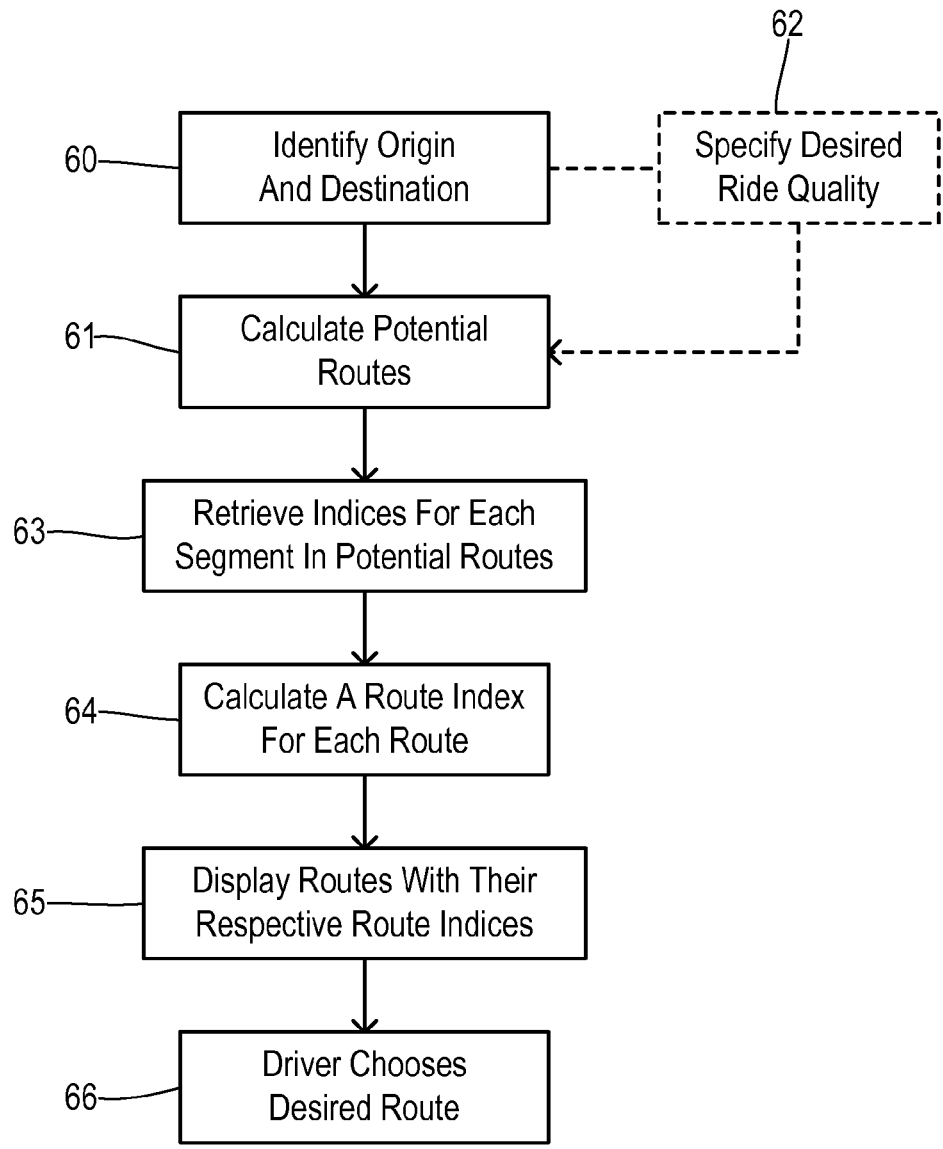
FIG. 8 is a flowchart of one preferred method for selecting a desired route based in part upon the expected ride quality associated with a route.

A preferred method for route planning is shown in FIG. 8. In step 60, an origination of a trip is identified (e.g., automatically by a vehicle-based GPS receiver) and a desired destination is identified by a subscribing user. Either an on-board or an off-board navigation system calculates potential routes to the identified destination in step 61. In some embodiments, a subscribing user may also specify a desired ride quality in step 62 so that only potential routes satisfying the desired ride quality are identified in step 61. During route generation (or alternatively after the potential routes have been assembled), ride quality indices are retrieved in step 63 for each segment in the potential routes. In step 64, a route index is calculated for each potential route. The indices may be communicated to the subscriber's vehicle. In step 65, a vehicle HMI displays each of the potential routes together with their respective route indices, thereby allowing the subscribing user to choose a desired route in step 66. Thus, even though a particular vehicle may not include an adaptive suspension system, it obtains the benefits of being able to determine a route satisfying a desired comfort level based on data previously collected by other vehicles that do contain adaptive suspension systems.

What is claimed is:

1. A method of route planning for road vehicles, comprising the steps of:
    a plurality of vehicles equipped with controlled suspensions calculating ride quality indices as the vehicles move over a plurality of road segments, wherein the ride quality indices comprise primary ride quality data and secondary ride quality data, wherein primary ride quality data corresponds to ride quality at a frequency of about 1-2 Hz, and secondary ride quality data corresponds to ride quality at a frequency of about 10 Hz;
    the plurality of vehicles transmitting the ride quality indices tagged with respective geographic coordinates to an aggregating server;
    the aggregating server determining a composite ride quality index for each road segment;
    a subscriber generating a route planning request identifying an origin and a destination;
    the subscriber communicating the route planning request to an agent;
    the agent accessing the ride quality indices from the aggregating server;
    identifying at least one potential route between the origin and the destination comprised of selected road segments;
    determining a route ride quality index in response to the selected road segments; and
    presenting the potential route and the route ride quality index to the subscriber for selection.

2. The method of claim 1 wherein the route planning request identifies a ride quality limit and wherein the selected road segments all satisfy the specified ride quality limit.

3. The method of claim 1 wherein a plurality of potential routes are identified, wherein a respective route ride quality index is determined for each potential route, and wherein each potential route is displayed for selection together with the respective route ride quality index.

4. The method of claim 1 wherein the route planning request identifies a primary ride quality limit and a secondary ride quality limit, and wherein the selected road segments all satisfy both the identified primary ride quality limit and the identified secondary ride quality limit.

5. A route planning system for road vehicles, comprising:
    a ride quality database representing a plurality of road segments according to geographic coordinates;
    an agent coupled to the ride quality database and adapted to be coupled to a data network,
        wherein the agent is configured to receive ride quality data via the data network from a plurality of vehicles traversing the road segments and to determine a composite ride quality index for each road segment according to the received ride quality data,
        wherein the ride quality data comprises primary ride and secondary ride,
            wherein primary ride corresponds to ride quality at a frequency of about 1-2 Hz, and secondary ride corresponds to ride quality at a frequency of about 10 Hz,
        wherein the ride quality data and the composite ride quality indices for each road segment are stored in the ride quality database in association with the respective road segment, and
        wherein the agent is configured to receive routing requests specifying a desired ride quality and to respond to the routing requests by retrieving road segments and the corresponding ride quality indices in response to the routing requests; and
    a route planner calculating potential routes and respective route indices by combining the ride quality indices of the road segments in each potential route.

6. The system of claim 1 wherein a routing request specifies a ride quality limit and wherein the agent responds to the routing request by retrieving road segments satisfying the specified ride quality limit.

7. The system of claim 1 wherein a routing request specifies a ride quality limit for primary ride and wherein the agent responds to the routing request by retrieving road segments satisfying the specified ride quality limit for primary ride.

8. The system of claim 1 wherein a routing request specifies a ride quality limit for secondary ride and wherein the agent responds to the routing request by retrieving road segments satisfying the specified ride quality limit for secondary ride.

9. The system of claim 1 wherein a routing request specifies a ride quality limit and wherein the agent responds to the routing request by retrieving road segments satisfying the specified ride quality limit, and wherein the ride quality limit is a composite index of primary ride and secondary ride.

10. The system of claim 1 wherein a routing request specifies a ride quality limit and wherein the agent responds to the routing request by excluding road segments exceeding the specified ride quality limit, and wherein the ride quality limit is a composite index of primary ride and secondary ride.

11. A route planning method for road vehicles, comprising:
  generating a route planning request identifying: an origin and a destination;
  identifying a route between the origin and the destination comprised of selected route road segments;
  accessing a ride quality database on a server, the ride quality database representing a plurality of road segments according to geographic coordinates, each segment associated with ride quality indices comprising primary ride quality data having a frequency of about 1-2 Hz and secondary ride having a frequency of about 10 Hz;
  determining a composite route ride quality index for the selected route road segments; and
  presenting the route and the composite route ride quality index to a road vehicle subscriber for selection.

12. The method of claim 11 wherein the route planning request identifies a ride quality limit and wherein the selected road segments all satisfy the specified ride quality limit.

13. The method of claim 11 wherein a plurality of potential routes are identified, wherein a respective composite route ride quality index is determined for each potential route, and wherein each potential route is displayed for selection together with the respective composite route ride quality index.

14. The method of claim 11 wherein the route planning request identifies a primary ride quality limit and a secondary ride quality limit, and wherein the selected road segments all satisfy both the identified primary ride quality limit and the identified secondary ride quality limit.

15. The method of claim 11 wherein a route planning request specifies a ride quality limit for primary ride and wherein the agent responds to the routing request by retrieving road segments satisfying the specified ride quality limit for primary ride.

16. The method of claim 11 wherein a route planning request specifies a ride quality limit for secondary ride and wherein the agent responds to the routing request by retrieving road segments satisfying the specified ride quality limit for secondary ride.

17. The method of claim 11 wherein a route planning request specifies a ride quality limit and wherein the agent responds to the routing request by retrieving road segments satisfying the specified ride quality limit, and wherein the ride quality limit is a composite index of primary ride and secondary ride.

18. The method of claim 11 wherein a route planning request specifies a ride quality limit and wherein the agent responds to the routing request by excluding road segments exceeding the specified ride quality limit, and wherein the ride quality limit is a composite index of primary ride and secondary ride.

19. A vehicle comprising:
  an adaptive damping system including a controller for characterizing primary and secondary ride quality as the vehicle moves over a plurality of road segments, wherein the ride quality characterized by the controller is comprised of primary ride having a frequency of about 1-2 Hz and secondary ride having a frequency of about 10 Hz, and wherein the transmitted ride quality data includes primary ride and secondary ride;
  a positioning system for monitoring coordinates of the vehicle; and
  a modem for transmitting ride quality data tagged with the coordinates of the vehicle to an aggregating server that evaluates a ride quality index for respective road segments to be used for route planning by other vehicles, wherein route planning comprises optimizing ride quality.

* * * * *